United States Patent [19]
Van Cleave et al.

[11] Patent Number: 6,000,268
[45] Date of Patent: Dec. 14, 1999

[54] MULTIFUNCTION MACHINE FOR MODIFYING MATERIAL IN A BENDING BRAKE

[75] Inventors: Jeffrey Van Cleave, Troy; Eugene G. Eichhorn, Pinckney, both of Mich.

[73] Assignee: Van Mark Products Corporation, Farmington Hills, Mich.

[21] Appl. No.: 09/203,593

[22] Filed: Dec. 2, 1998

[51] Int. Cl.$^6$ .................................................. B21D 43/28
[52] U.S. Cl. .............................................. 72/211; 72/294
[58] Field of Search ............................. 72/294, 319, 211, 72/210; 83/614, 485, 500

[56] References Cited

U.S. PATENT DOCUMENTS

| | | | |
|---|---|---|---|
| 1,265,608 | 5/1918 | Carpenter | 72/482.5 |
| 4,566,304 | 1/1986 | Van Cleave et al. | |
| 4,660,399 | 4/1987 | Suter et al. | |
| 4,787,233 | 11/1988 | Beymer | |
| 4,989,429 | 2/1991 | Del Fabro et al. | |
| 5,425,259 | 6/1995 | Coben et al. | |
| 5,582,053 | 12/1996 | Chubb et al. | |
| 5,632,174 | 5/1997 | Hunter et al. | |
| 5,706,693 | 1/1918 | Chubb et al. | 72/294 |

FOREIGN PATENT DOCUMENTS

| | | |
|---|---|---|
| 2158684 | 3/1996 | Canada . |
| 2504429 | 10/1982 | France . |
| 4235629 | 4/1994 | Germany . |

OTHER PUBLICATIONS

Tapco Products Company Advertisement re: Pro Cut–Off, 1997.
Schechtl Advertisment re: Die Mobilen am Bau, May, 1996.
Knoll–Profilierkopf/Knoll–Schneidkopf Advertisement, 1993.
Peter Wukovich GesmbH "Wuko Handgerate" Advertisement, Jan. 1991.
Fedor Ulisch GMBH Varia 1020/Varia 2050 Advertisement, Feb., 1993.
Van Mark Products Corporation Advertisement "The Short-Cut", Oct., 1997.
Fedor Ulisch GmbH Klempnerei–Maschinen Advertisement, Jan., 1991.
Dimos "Coupe–Feuille Rotalame" Advertisement (Made of record in U.S. Patent No. 5,582,053, issued Dec. 10, 1996).
Nesta Couverture "Outil de Coupe" Advertisement (Made of record in U.S. Patent No. 5,582,053, issued Dec. 10, 1996).

*Primary Examiner*—Rodney Butler
*Attorney, Agent, or Firm*—Brooks & Kushman P.C.

[57] ABSTRACT

A multifunction machine for modifying a workpiece held in a bending brake is provided that allows one tool to be easily interchanged with another tool. The machine includes a carriage operable to move longitudinally along the bending brake, and a tool detachably connected to the carriage and operable to modify the workpiece. The tool can be detached from the carriage and interchanged with another tool for performing a different modification to the workpiece. In a preferred embodiment, either the tool or the carriage includes a projection extending therefrom, and the other includes an opening sized to receive the projection in order to connect the tool and the carriage. The tool preferably includes rotatably mounted rolls that may be used for cutting or forming the workpiece. The multifunction machine is intended to be used in conjunction with any type of bending brake.

31 Claims, 3 Drawing Sheets

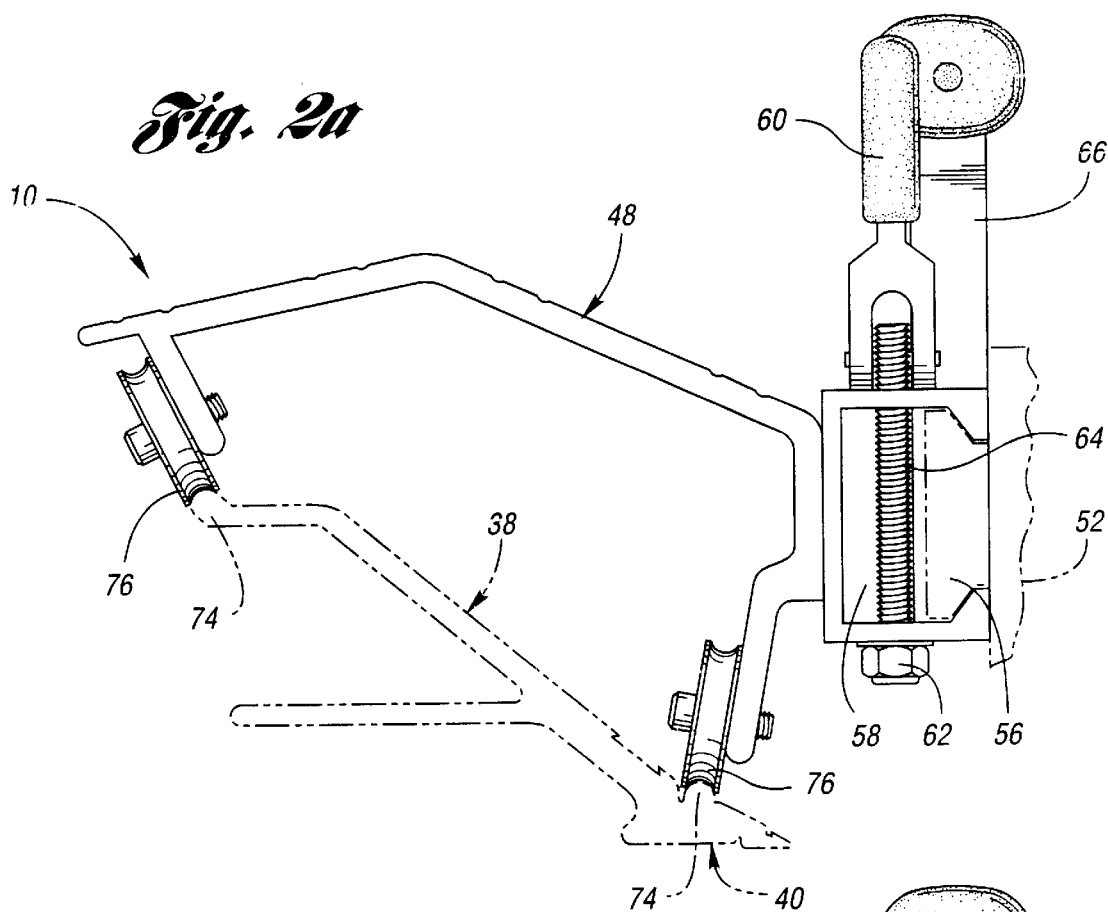
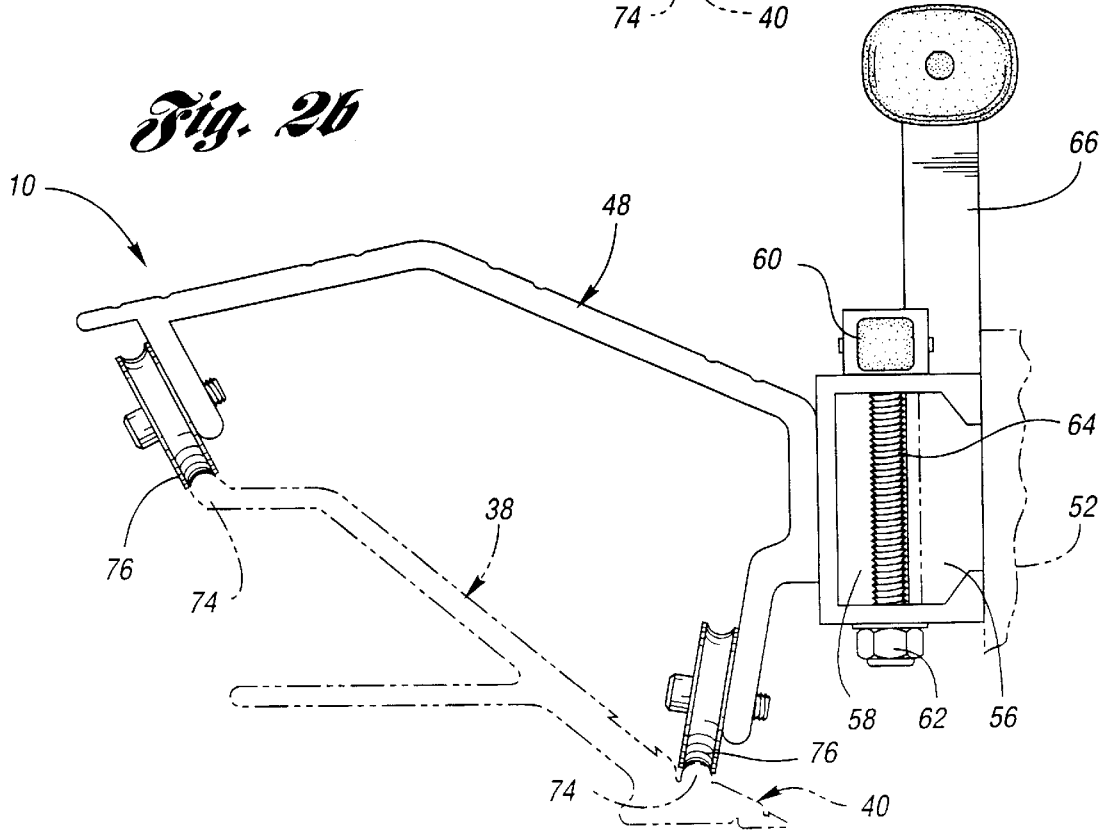

MULTIFUNCTION MACHINE FOR MODIFYING MATERIAL IN A BENDING BRAKE

TECHNICAL FIELD

This invention relates to an multifunction machine for cutting or shaping a workpiece held in a bending brake.

BACKGROUND ART

Portable bending brakes are used at job sites for bending relatively thin gauge sheet material, such as metal or plastic sheets used to sheath portions of homes or other buildings. Bending brakes are usually constructed of an array of support castings that are held together by an appropriate frame. The castings are provided with a clamp and a bending structure that clamps and bends sheet material at the open ends of the castings.

To improve the utility of a portable bending brake, it would be desirable to be able to cut and shape a workpiece while the workpiece is clamped in the brake. For example, an operator may wish to cut an edge from the workpiece or to form the edge in some manner. An example of a cutter used in conjunction with a bending brake can be found in French patent No. 2504429 issued to Goubaud, whereas German patent No. DE 4235629 issued to Knoll describes a bending brake provided with both a cutting device and a separate roll forming device.

A need exists for a multifunction machine that would allow an operator to switch easily between cutting and forming accessories at a job site. It would be desirable to provide a multifunction machine that eliminates unnecessary duplication of structure between different cutting and forming accessories. Another design objective of such a multifunction machine is to minimize the weight of the machine and its accessories, all at a low cost.

DISCLOSURE OF INVENTION

Therefore, it is an object of the present invention to provide a multifunction machine incorporating interchangeable tools for modifying material in a bending brake.

It is a further object of the present invention to provide a multifunction machine which allows one tool to be interchanged easily with another tool that performs a different function to material in a bending brake.

It is another object of the present invention to provide a multifunction machine for modifying material in a bending brake that minimizes unnecessary duplication of structure which providing full feature functionality between different tools.

It is still another object of the present invention to provide a multifunction machine operable on a bending brake, where the machine uses tools that are durable and easy to maintain.

Accordingly, a multifunction machine for modifying a workpiece held in a bending brake is provided that allows one tool to be easily interchanged with another tool. The machine includes a carriage operable to move longitudinally along the bending brake, and a tool detachably connected to the carriage and operable to modify the workpiece. The tool can be detached from the carriage and interchanged with another tool for performing a different modification to the workpiece. In a preferred embodiment, either the tool or the carriage includes a projection extending therefrom, and the other includes an opening sized to receive the projection in order to connect the tool and the carriage. The tool preferably includes rotatably mounted rolls that may be used for cutting or forming the workpiece. The multifunction machine is intended to be used in conjunction with any type of bending brake.

The above objects and other objects, features, and advantages of the present invention will be more readily understood in view of the attached drawings, the following description of the best mode for carrying out the invention, and claims.

BRIEF DESCRIPTION OF DRAWINGS

FIGS. 2a and 2b are end views of the multifunction machine engaging a guide provided on the bending brake, wherein a clamp provided on the machine is shown in an open position and in a closed position, respectively;

BEST MODE FOR CARRYING OUT THE INVENTION

The present invention is directed to a multifunction machine that allows an operator to easily interchange tools for modifying sheet material held within a bending brake. The invention is described in connection with the type of portable sheet bending brake disclosed in U.S. Pat. No. 4,566,304 that issued to Van Cleave et al., the disclosure of which is incorporated herein by reference. However, it will be appreciated that the invention may also be used with other types of bending brakes.

Figure 1:
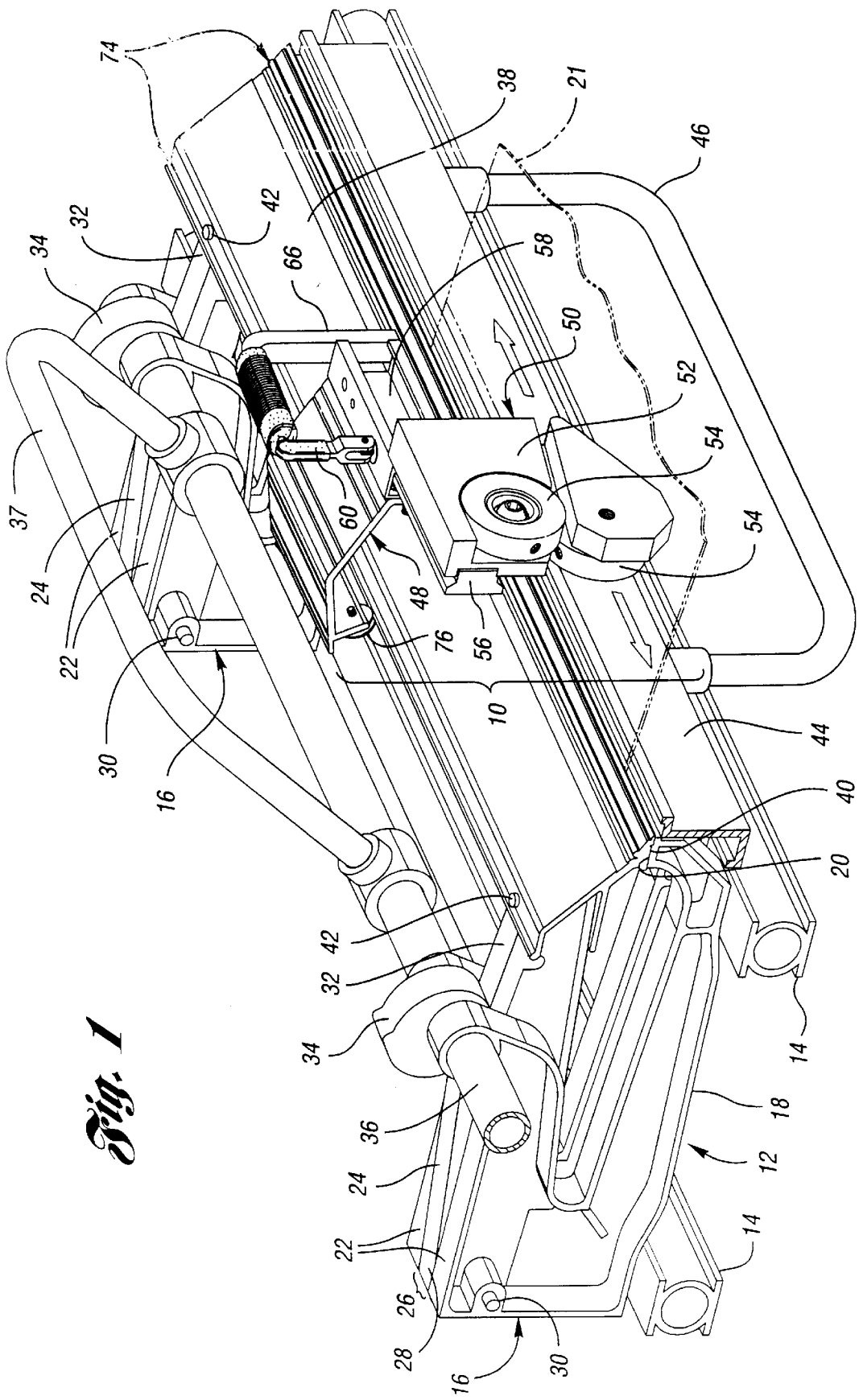
FIG. 1 is a fragmentary view of a bending brake on which is mounted a multifunction machine constructed in accordance with the present invention.

Referring to FIG. 1, the multifunction machine of the present invention, designated by reference numeral 10, is illustrated in conjunction with a portable sheet bending brake 12. A relatively small bending brake 12 is illustrated. It is understood, however, that while commercial bending brakes are generally larger than the illustrated brake 12, their construction and principles of operation are similar to bending brake 12.

Bending brake 12 comprises a base 14 with at least two longitudinally spaced C-shaped aluminum support castings 16 that are secured to base 14. Each support casting 16 includes a lower arm 18 which terminates in a horizontal support surface 20 for supporting a workpiece 21, and further includes an upper arm 22 spaced from and overlying the lower arm 18.

In the specific type of bending brake 12 depicted herein, upper arm 22 terminates short of support surface 20 and supports a cam locking mechanism operable upon a clamping arm 24 provided for each support casting 16. Clamping arm 24 is mounted in a vertical slot 26 defined by upper arm 22. Clamping arm 24 has a first end 28 pivotally secured, such as by a pivot pin 30, to support casting 16 and a second end 32 projecting toward horizontal support surface 20. An eccentric cam 34 is disposed in each slot 26, and each cam 34 is mounted to be corotatable with a shaft 36 extending through upper arms 22. Shaft 36 is provided with a handle 37 for manually rotating shaft 36 and cams 34.

A clamping member 38 is mounted at second ends 32 of clamping arms 24. Clamping member 38 has a clamping surface 40 which overlies horizontal support surface 20 and is cooperable therewith for clamping a workpiece 21 therebetween. Suitable fasteners, such as vertical bolts 42, are used to secure clamping member 38 to clamping arms 24. Using handle 37, shaft 36 may be rotated, causing cams 34 to depress clamping arms 24. When lowered, clamping arms 24 move clamping member 38 into engagement with workpiece 21 positioned on support surface 20. Further details of the rotary cam locking system described above may be found in U.S. Pat. No. 4,566,304.

A bending leaf 44, provided with a depending handle 46, is hinged to horizontal support surface 20 for bending the workpiece 21. Bending leaf 44 and support surface 20 are typically interconnected by a hinge pin (not shown). Bending leaf 44 may be moved by swinging handle 46 upwardly to bring bending leaf 44 into engagement with the workpiece. Legs (not shown) may be provided beneath base 14 as needed to support bending brake 12 above the floor.

Referring to FIGS. 1–4, multifunction machine 10 comprises a carriage 48 operable to move longitudinally along bending brake 12, and a tool 50 detachably connected to carriage 48 and operable to modify workpiece 21. Carriage 48 is preferably formed with an inverted "U" shape as shown, which serves to minimize the material necessary for its construction. However, carriage 48 may comprise any shape which is suitable for movement along bending brake 12. Tool 50 includes a tool body 52 and a pair of rolls 54 rotatably mounted in abutting relationship on tool body 52. Rolls 54 are mounted with overlapping peripheries, where rolls 54 cooperate to modify the workpiece 21 as the workpiece 21 is passed between the rolls 54.

In prior art devices, a tool is typically fastened to a carriage structure in a fixed manner, by screws or the like, such that the tool cannot be easily removed from the carriage. In the device of the present invention, tool 50 is secured to carriage 48 in a more easily removable manner. Preferably, as depicted in the end view of FIGS. 2a and 2b, tool body 52 includes a projection 56 extending therefrom and carriage 48 includes an opening 58 sized to receive projection 56. Although a particular geometry of projection 56 and opening 58 are illustrated herein, any suitable mating shapes could be utilized. For example, projection 56 could comprise a first C-shaped member that interlocks with a second, reciprocal C-shaped member representing opening 58. With any configuration, projection 56 could alternatively be located on carriage 48 and opening 58 could be provided on tool 50.

As shown in FIGS. 2a and 2b, multifunction machine 10 preferably includes a clamp 60 provided on either tool 50 or carriage 48. Clamp 60 has an open position (FIG. 2a) which allows tool 50 to be removed from carriage 48 and a closed position (FIG. 2b) which secures tool 50 to carriage 48. Preferably, the pressure exerted by clamp 60 in the closed position is adjustable, such as by using a nut 62 and bolt 64 arrangement extending through opening 58. In the embodiment of machine 10 shown in FIGS. 2a and 2b, clamp 60 is provided on carriage 48. With this configuration, a clamp 60 is not required on each different tool 50, thereby preventing the necessity of duplicating this component on different tools 50. While a toggle type clamp 60 is depicted herein, clamp 60 could comprise any structure suitable to detachably connect tool 50 and carriage 48. For instance, clamp 60 may include a quick pin or quick bolt removably insertable through one of the tool 50 or the carriage 48 to make contact with the other.

In a preferred embodiment, carriage 48 is easily removable from bending brake 12 at any point along brake 12. Alternatively, carriage 48 could be fixed to brake 12 and just slide to one end of brake 12 for storage during bending operations. Preferably, carriage 48 is manually movable along bending brake 12 but, alternatively, movement of carriage 48 may be motorized.

In order to aid in movement of multifunction machine 10 along bending brake 12, either carriage 48 or tool 50 is preferably provided with a handle 66. In a preferred configuration, handle 66 is provided on carriage 48, such that the duplication of this structure among different tools is eliminated. On carriage 48, handle 66 is preferably located at the end of opening 58, such that projection 56 on tool body 52 slides into opening 58 and abuts handle 66. Projection 56 may then be clamped by clamp 60 in a standardized position within opening 58. In addition to handle 66, tool body 52 could also be provided with an additional handle (not shown) to provide an additional grip location for an operator when thick material is to be cut or shaped.

Therefore, multifunction machine 10 of the present invention provides a tool 50 which can be easily removed from a carriage 48 and interchanged with another tool 50 for performing a different modification to a workpiece held in a bending brake 12. Furthermore, machine 10 of the present invention obviates the necessity of providing carriage 48 or handle 66 structures on each tool 50, thereby reducing the cost and weight of additional tools 50.

Figure 3:
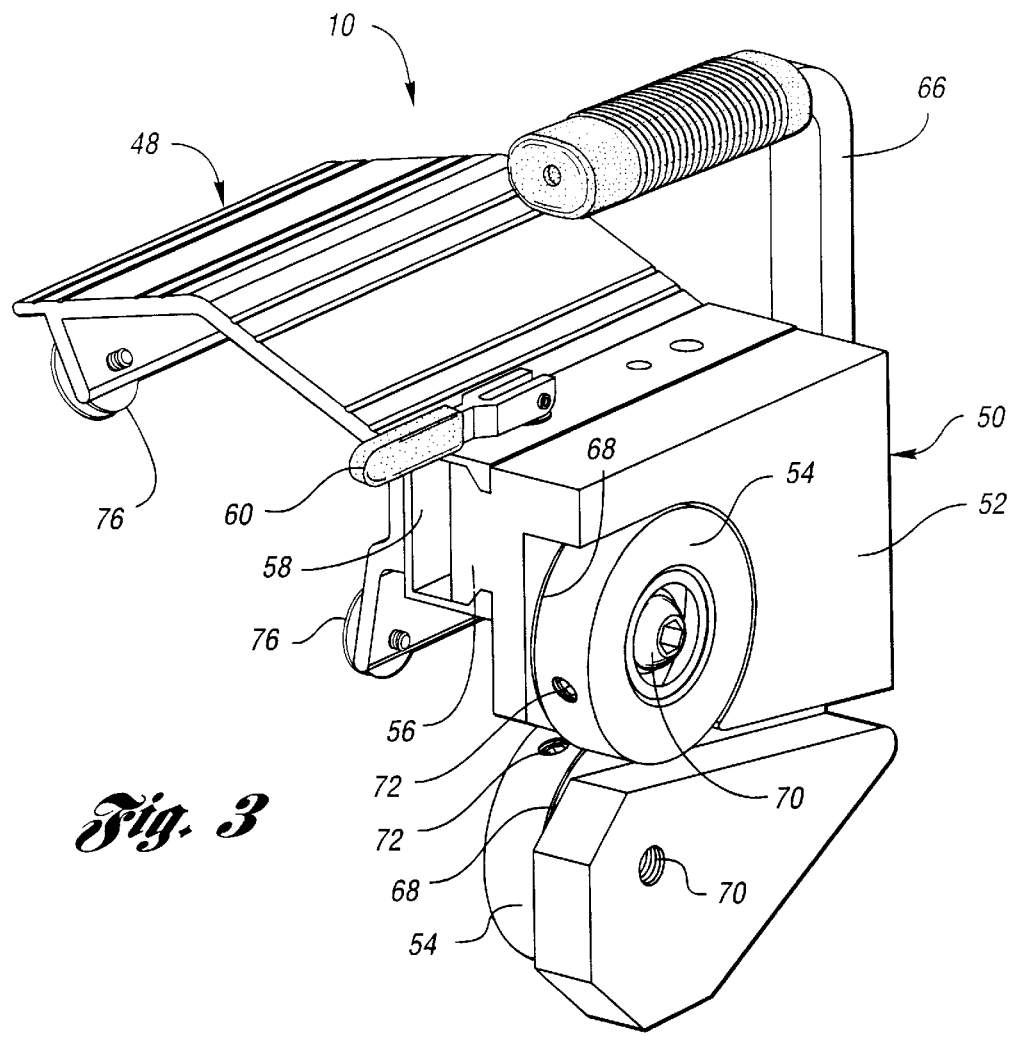
FIG. 3 is a perspective view of the multifunction machine wherein the tool comprises a cutter.

In the embodiment of multifunction machine 10 depicted in FIGS. 1 and 3, tool 50 comprises a cutter. In cutter 50, rolls 54 comprise cutting rolls which may be tapered inwardly and each have a cutting edge 68 operable to cut workpiece 21. Cutting rolls 54 are rotatably mounted to tool body 52, preferably along shafts, such as bolts 70, that are affixed to tool body 52. Cutting rolls 54 may be fastened to shafts 70 by any suitable means, preferably using set screws 72 or the like. A roller bearing (not shown) extends into a cylindrical recess formed in each roll 54 to surround shaft 70.

Therefore, rolls 54 are mounted to be removable. Furthermore, since cutting rolls 54 can be mounted anywhere along shaft 70 by adjusting screws 72, each cutting edge 68 may be resharpened. Once resharpened, cutting rolls 54 are replaced on shafts 70 at a new position to compensate for the loss of material through sharpening. If cutting rolls 54 were not shaft-mounted, but rather were fixed-mounted as in certain prior art devices, then sharpening cutting edges 68 would leave a gap between cutting rolls 54, such that they would no longer be in abutting relationship and not function properly.

Figure 4:
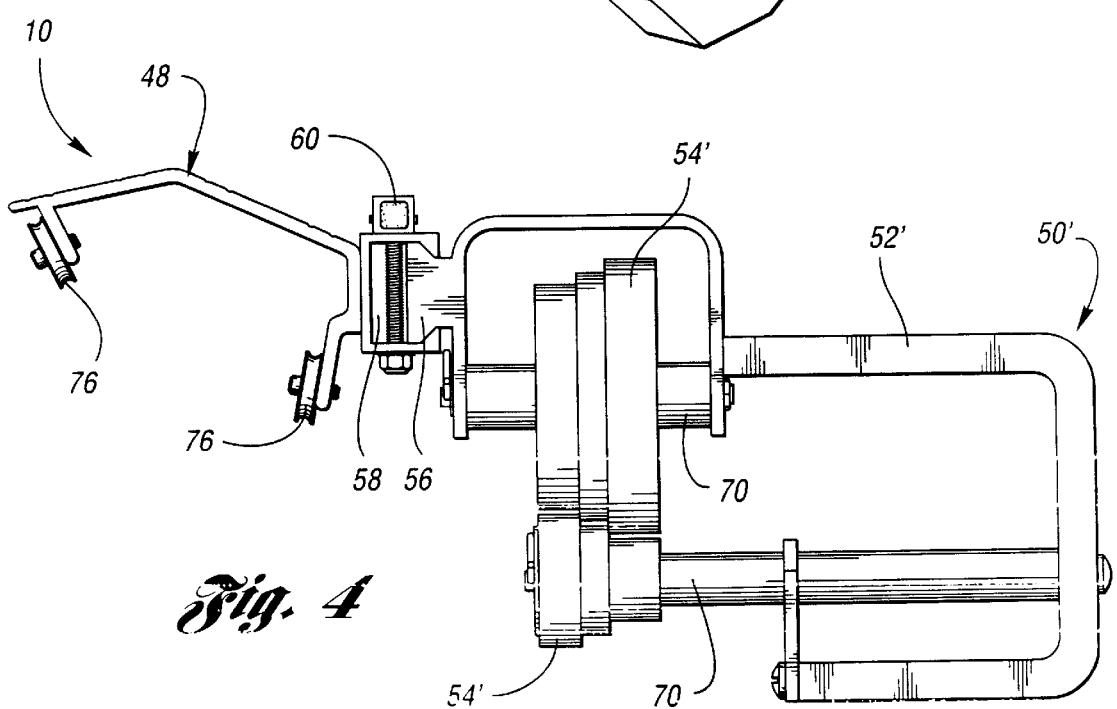
FIG. 4 is an end view of the multifunction machine wherein the tool comprises a roll former.

In another embodiment of multifunction machine 10 depicted in FIG. 4, the tool comprises a roll former 50' and the rolls comprise forming rolls 54' which are operable to shape workpiece 21. As above, forming rolls 54' are rotatably mounted to shafts 70, and rolls 54' are removable and interchangeable with other forming rolls. Although a particular shape of forming rolls 54' is depicted herein, various geometric configurations for forming rolls 54' can be utilized with device 10 of the present invention in order to form different shapes in the workpiece such as strengthening ribs or decorative beads. In a preferred embodiment, tool body 52' is generally C-shaped and extends in a plane substantially perpendicular to a longitudinal axis of bending brake 12.

With reference to FIGS. 1 and 2, bending brake 12 is preferably provided with a guide 74 along which carriage 48 is moved. Guide 74 is either formed integrally on brake 12, as shown in FIG. 1, or is removably mounted thereon. Guide 74 is preferably provided on clamping member 38 as shown, but may alternatively be provided on another part of bending brake 12, such as bending leaf 44. Guide 74 is formed as a raised portion of clamping member 38, and carriage 48 supports at least one pair of longitudinally spaced rollers 76 having concave peripheries operable to engage guide 74. Of course, rollers 76 could alternatively be formed as convex wheels and guide 74 could be concave in shape. In the preferred embodiment depicted in FIGS. 1 and 2, guide 74 comprises two separate raised portions, and carriage 48 has two sets of rollers 76 for movement along guide 74 for capturing and securing device 10 to bending brake 12 with greater stability. Guide 74 allows an operator to use multifunction machine 10 to make straight and accurate cuts or roll form shapes with ease.

Therefore, multifunction machine 10 of the present invention reduces material handling and saves time by allowing an operator to bend a workpiece into the desired shape, cut the workpiece to an appropriate size, and roll form shapes into the workpiece all at the same time. Furthermore, multifunction machine 10 of the present invention may be utilized by requiring at most a minimal modification of a bending brake 12, and can be readily added to an existing bending brake 12. In addition, multifunction machine 10 of the present invention can be utilized with other material-working apparatuses, such as a slitting machine, a coil holder, or a basic work table.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A machine for modifying a workpiece held within a bending brake, the machine comprising:
    a carriage operable to move longitudinally along the bending brake;
    a tool detachably connected to the carriage and operable to modify the workpiece, wherein one of the tool or the carriage includes a clamp, the clamp having a closed position which secures the tool to the carriage and an open position which allows the tool to be removed from the carriage, such that the tool is removable from the carriage and interchangeable with another tool for performing a different modification to the workpiece.

2. The machine of claim 1, wherein one of the tool or the carriage includes a projection extending therefrom and the other includes an opening sized to receive the projection.

3. The machine of claim 1, wherein the carriage is removable from the bending brake.

4. The machine of claim 1, wherein the carriage is manually movable along the bending brake.

5. The machine of claim 1, wherein a pressure exerted by the clamp in the closed position is adjustable.

6. The machine of claim 1, further comprising a handle provided on the carriage.

7. The machine of claim 1, wherein the tool includes a tool body and a pair of rolls rotatably mounted in abutting relationship on the tool body.

8. The machine of claim 7, further comprising a handle provided on the tool body.

9. The machine of claim 7, wherein the rolls are removably mounted along shafts affixed to the tool body.

10. The machine of claim 7, wherein the rolls are cutting rolls, each cutting roll having a cutting edge operable to cut the workpiece held within the bending brake.

11. The machine of claim 7, wherein the rolls are forming rolls operable to form the workpiece held within the bending brake.

12. The machine of claim 10, wherein the cutting edge is resharpenable.

13. The machine of claim 11, wherein the forming rolls are interchangeable with other forming rolls of different shapes.

14. A machine for modifying a workpiece held within a material-working apparatus, the machine comprising:
    a carriage operable to move longitudinally along the apparatus; and
    a tool detachably connected to the carriage and operable to modify the workpiece, wherein one of the tool or the carriage includes a clamp, the clamp having a closed position which secures the tool to the carriage and an open position which allows the tool to be removed from the carriage, such that the tool is removable from the carriage and interchangeable with another tool for performing a different modification to the workpiece.

15. A bending brake comprising:
    base;
    at least two longitudinally spaced C-shaped support castings secured in assembly to the base, each support casting including a lower arm terminating in a horizontal support surface for supporting a workpiece, and an upper arm spaced from and overlying the lower arm;
    a clamping arm for each casting, each clamping arm having a first end pivotally secured to the support casting and a second end projecting toward the horizontal support surface;
    a clamping member affixed to the second end of each clamping arm, the clamping member overlying the horizontal support surface and cooperable therewith for clamping a workpiece therebetween;
    a bending leaf hinged to the horizontal support surface for bending the workpiece; and
    a machine for modifying the workpiece clamped in the bending brake, the machine including a carriage operable to move longitudinally along the bending brake, and a tool detachably connected to the carriage and operable to modify the workpiece, wherein one of the tool or the carriage includes a clamp, the clamp having a closed position which secures the tool to the carriage and an open position which allows the tool to be removed from the carriage, such that the tool is removable from the carriage and interchangeable with another tool for performing a different modification to the workpiece.

16. The bending brake of claim 15, wherein one of the tool or the carriage includes a projection extending therefrom, and the other includes an opening sized to receive the projection.

17. The bending brake of claim 15, wherein the carriage is removable from the bending brake.

18. The bending brake of claim 15, wherein the carriage is manually movable along the bending brake.

19. The bending brake of claim 15, wherein a pressure exerted by the clamp in the closed position is adjustable.

20. The bending brake of claim 15, further comprising a handle provided on the carriage.

21. The bending brake of claim 15, wherein the tool includes a tool body and a pair of rolls rotatably mounted in abutting relationship on the tool body.

22. The bending brake of claim 15, further comprising a guide along which the carriage is moved.

23. The bending brake of claim 21, further comprising a handle provided on the tool body.

24. The bending brake of claim 21, wherein the rolls are removably mounted along shafts affixed to the tool body.

25. The bending brake of claim 21, wherein the rolls are cutting rolls, each cutting roll having a cutting edge operable to cut the workpiece held within the bending brake.

26. The bending brake of claim 21, wherein the rolls are forming rolls operable to form the workpiece held within the bending brake.

27. The bending brake of claim 25, wherein the cutting edge is resharpenable.

28. The bending brake of claim 26, wherein the forming rolls are interchangeable with other forming rolls of different shapes.

29. The bending brake of claim 22, wherein the guide is provided on the clamping member.

30. The bending brake of claim 22, wherein the guide is provided on the bending leaf.

31. The bending brake of claim 22, wherein the carriage includes at least one pair of longitudinally spaced rollers operable to engage the guide.

* * * * *